United States Patent
Chow et al.

[15] 3,681,473
[45] Aug. 1, 1972

[54] LACTAM POLYMERIZATION WITH N-SUBSTITUTED NYLON-1 INITIATOR

[72] Inventors: Sui-Wu Chow, Somerville; Markus Matzner, Edison; James E. McGrath, Somerville, all of N.J.

[73] Assignee: Union Carbide Corporation, New York, N.Y.

[22] Filed: April 23, 1971

[21] Appl. No.: 136,974

Related U.S. Application Data

[63] Continuation-in-part of Ser. No. 21,356, March 20, 1970, abandoned.

[52] U.S. Cl....260/857 TW, 260/77.5 NC, 260/78 L, 260/858
[51] Int. Cl..........................C08g 41/04, C08g 22/00
[58] Field of Search.....................260/857 TW, 858, 77.5, 78 L

[56] References Cited

UNITED STATES PATENTS

| | | | |
|---|---|---|---|
| 2,965,614 | 12/1960 | Shashoua | 260/77.5 NC |
| 3,086,962 | 4/1963 | Mottus | 260/78 L |
| 3,320,335 | 5/1967 | Hedrick | 260/78 L |
| 3,448,085 | 6/1969 | Pietrusza | 260/78 L |

OTHER PUBLICATIONS

Shashoua, V. E. et al., J.A.C.S. 82 pages 866–873. (1960)

*Primary Examiner*—Paul Lieberman
*Attorney*—Paul A. Rose, Gerald R. O'Brien, Jr., Aldo John Cozzi and James J. O'Connell

[57] ABSTRACT

Certain N-substituted nylon-1 compounds are utilized as non-toxic polymerization initiators or activators with alkaline catalyst in the anionic polymerization of lactam monomer so as to provide for a rapid polymerization process wherein polymerization conditions are more readily controlled due to the gradual development of exotherms.

10 Claims, 1 Drawing Figure

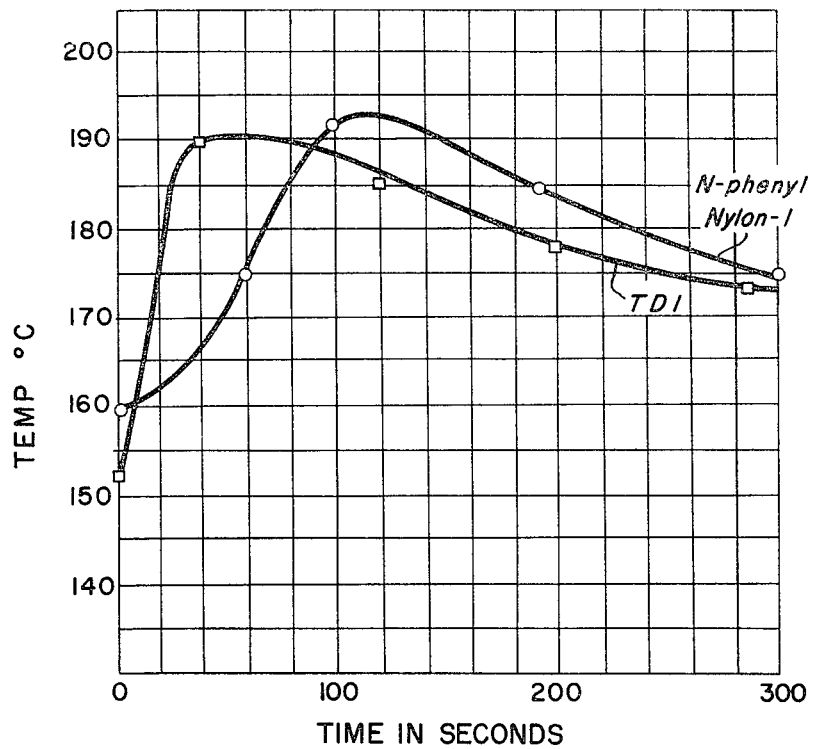

LACTAM POLYMERIZATION WITH N-SUBSTITUTED NYLON-1 INITIATOR

CROSS-REFERENCE TO RELATED APPLICATIONS

This patent application is a continuation-in-part of U.S. Pat. application, Ser. No. 21,356 filed Mar. 20, 1970, now abandoned.

BACKGROUND OF THE INVENTION

1. Field of the Invention

The invention relates to the anionic polymerization of lactam monomer.

2. Description of the Prior Art

In the anionic polymerization of lactams there is usually employed a catalyst-initiator system. The catalyst is commonly a material which will form an alkali or alkaline earth metal salt of the lactam. The initiators or activators that have been used to date have included a number of materials such as various isocyanate materials as disclosed, for example, in U.S. Pat. Nos. 3,028,369; 3,423,372 and 3,440,227. Although 3,440,227. prior art catalyst-initiator systems generally provide for a relatively fast rate of polymerization, most, if not all, of the isocyanate initiators which have been used to date are quite toxic and some are also volatile materials. The toxicity and volatility of these materials creates health hazards during their use in the polymerization reaction, and also represents a potential hazard for end users of the polymeric products, where such products contain residual quantities of such initiators.

The use of the prior art isocyanate initiators, also results in relatively large exotherms during the polymerization reactions, which presents problems with respect to control of the operating conditions, such as the operating temperature, during the polymerization reactions.

SUMMARY OF THE INVENTION

Lactams are anionically polymerized utilizing a catalyst-initiator system whereby the lactam can be readily polymerized in a relatively short period of time using a non-toxic and non-volatile initiator, and whereby the initiator also allows for a facile control of the polymerization reaction because of the relatively gradual development of exotherms resulting from the use of the initiator. This system contains an anionic catalyst and, as the initiator or activator, one or more of certain N-substituted nylon-1 compounds.

An object of the present invention is to provide an anionic polymerization process whereby lactams may be readily polymerized in a relatively short period of time to provide high molecular weight nylon polymers.

Another object of the present invention is to provide a novel initiator or activator system for use in the anionic polymerization of lactam monomers.

A further object of the present invention is to provide an initiator or activator for use in the anionic polymerization of lactam monomers which is relatively non-toxic and non-volatile, and which provides for a relatively facile control of the polymerization reaction.

A still further object of the present invention is to provide an anionic lactam polymerization system which provides for a relatively gradual development of exotherm and thus allows the system to be used under a wide range of operating conditions.

BRIEF DESCRIPTION OF THE DRAWING

The drawing is a graph on which there is plotted the exotherms (temperature vs. time) resulting during the experiments described in Examples 7 and 8 hereinafter.

DESCRIPTION OF THE PREFERRED EMBODIMENT

It has now been found that lactams may be polymerized anionically so as to provide the objects of the present invention if there is employed as the catalyst-initiator system for such polymerization, an anionic catalyst and, as an initiator or activator, one or more of certain N-substituted nylon-1 compounds.

THE LACTAMS

The lactams which may be polymerized according to the present invention are all those which are capable of being polymerized anionically, and are preferably those lactam monomers which contain at least one ring group of the structure

wherein $n$ is a whole number which is 3 to 15, and preferably 3 to 10, and $R_1$ and $R_2$ may be the same or different radicals on each carbon atom and may be H or $C_1$ to $C_{10}$ hydrocarbon.

Such lactams would include those having a single ring structure such as 2-pyrrolidone, 2-piperdone, 6-methyl-2-piperidone, ε-caprolactam, enantholactam, capryllactam, lauryl-lactam, decanolactam, undecanolactam, dodecanolactam, penta-decanolactam, hexadecanolactam, alkyl substituted caprolactams, aryl substituted lactams, and the like.

Lactams having a plurality of ring structures which may be used in the present invention include bis-lactams such as alkylene bis lactams of the formula

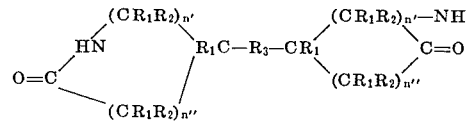

wherein $n'$ and $n''$ are each whole numbers such that $n'$ and $n''$ is 2 to 14; $R_1$ and $R_2$ are as defined above; and $R_3$ may be $C_1$ to $C_4$ alkylene such as methylene, ethylene, propylene and butylene; phenylene and substituted phenylene; O and S.

Other lactams having a plurality of ring structures include bicyclic lactams, such as those represented by the formulas:

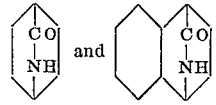

The lactams to be polymerized can be used individually or in any combination thereof.

THE INITIATOR

The initiator which is to be employed in the present invention is a compound having the structure

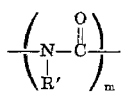

wherein $m$ is a whole number which is about 5 to 100, inclusive, and $R'$ is a $C_1$ to $C_{20}$, inclusive saturated or unsaturated hydrocarbon radical which is a primary alkyl, primary aralkyl or primary alkenyl group, or an aryl or alkaryl group, with the proviso that in each of the latter two groups each annular carbon atom (carbon atom in the ring of the aryl radical) therein which is adjacent to the carbon atom attached to the nitrogen atom bears one hydrogen atom, and with the further proviso that $R'$ is free of substituents which are reactive with either the isocyanate $R'NCO$ in solution at temperatures below about $-20°$ C. or which are more reactive with the lactam component of the lactam polymerization system of the present invention than is the carbonyl group in such initiator. $R'$ may contain any substituents which do not contain active hydrogen atoms, that is, hydrogen atoms which display activity to the Zerewitinoff test, or which are active towards other components of the lactam polymerization system such as the anionic catalyst.

The term "primary", as utilized in conjunction with the term alkyl, aralkyl, alkenyl, etc., isocyanates refers to isocyanates in which the isocyanate or $-N = C = O$ group is attached to a carbon atom bearing at least two hydrogen atoms. Thus, methyl, ethyl, propyl, butyl, and isobutyl groups are representative alkyl groups included within the scope of this invention, but alkyl groups such as isopropyl, secondary butyl, and the like are not included within the scope of this invention. Similarly, in the classes of aralkyl and alkenyl groups, arylisopropyl isocyanate and vinyl isocyanate are not within the scope of this invention.

Aromatic isocyanates such as aryl isocyanates and alkaryl isocyanates in which each annular carbon atom adjacent to the carbon atom attached to the nitrogen of the isocyanate group bears one hydrogen atom (is unsubstituted) may also be utilized to advantage in this invention. Representative useful aromatic isocyanates include, phenyl, m-tolyl, beta-naphthyl, 3-biphenylyl, alkoxyphenyl, p-chlorophenyl, m-chlorophenyl, p-cyanophenyl, and the like.

Representative primary alkyl isocyanates which may be mentioned include methyl, ethyl, propyl, butyl, isobutyl, amyl, hexyl, heptyl, octyl, and higher alkyl isocyanates, such as undecyl, octadecyl, and the like. Unsaturated primary alkyl isocyanates which may be utilized include allyl, decenyl, and intermediate alkenyl isocyanates which are primary type, that is, the isocyanate group is attached to a carbon atom bearing two hydrogen atoms. Also carbalkoxyalkyl isocyanates may be used, such as, for example, carbethoxymethyl, carbethoxyethyl, and higher homologs. Aralkyl compounds which are useful in this invention include benzyl, phenylethyl, and phenylalkyl isocyanates containing a large number of carbon atoms in the aliphatic chain as well as aralkyl compounds in which the aryl group is substituted with other alkyl or non-alkyl groups, for example, methoxy, chloro, cyano groups, and the like.

The initiators of the present invention may be prepared, as disclosed by Sashoua et al. in Journal of the American Chemical Society, Volume 82, page 866–873 (1960) and in U.S. Pat. No. 2,965,614, by anionically polymerizing an isocyanate monomer having the structure $R'NCO$ wherein $R'$ is as defined above. The preferred initiators are those in which $R'$ is aryl, substituted or unsubstituted.

Examples of the initiators which may be used in the present invention are:
poly(ethyl isocyanate)
poly(n-propyl isocyanate)
poly(n-butyl isocyanate)
poly(isobutyl isocyanate)
poly(n-amyl isocyanate)
poly(n-hexyl isocyanate)
poly(n-heptyl isocyanate)
poly(n-undecyl isocyanate)
poly(n-octadecyl isocyanate)
poly(allyl isocyanate)
poly(9-decenyl isocyanate)
poly(benzyl isocyanate)
poly(phenyl isocyanate)
poly(m-methyl phenyl isocyanate)
poly(p-methyl phenyl isocyanate)
poly(p-methoxyphenyl isocyanate)
poly-[3(α-isocyanatoethyl)-phenyl]
poly(2,4-toluene diisocyanate)
poly(trimethylsilyl isocyanate)
poly(carbethoxymethyl isocyanate)
poly(2-cyanoethyl isocyanate)

The initiators of the present invention may be used individually or in combination with one another or with one or more other initiators. About 0.1 to 10 moles of initiator are employed per 100 moles of lactam monomer being polymerized.

THE POLYMERS

The use of the initiators of the present invention results in the preparation of polymers by the following reactions:

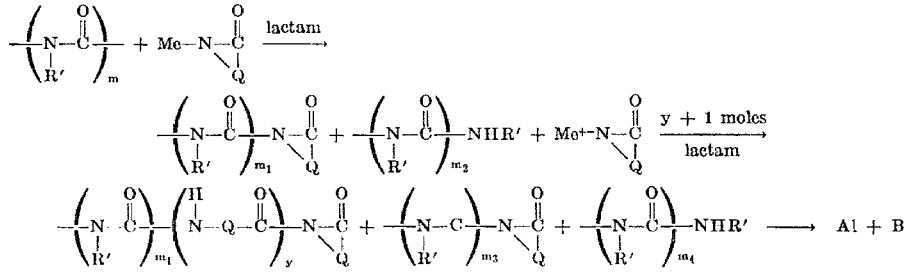

wherein AL. represents a polymeric system which comprises one or more polymers wherein L represents all the polymerized chains of lactam monomer in such system, each of which chains may be represented by

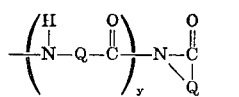

and each of which chains is bonded to an initiator segment as noted above, y is a whole number, the value of which may vary somewhat in each polymerized lactam chain, and each y will be about 10 to 5000, A represents one or more cleavage products resulting from the cleavage of the chain of the initiator as shown above, and A may be represented by

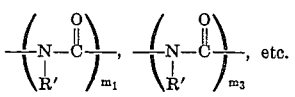

the above disclosed equations,

B represents one or more other cleavage products resulting from the cleavage reaction and may be represented by

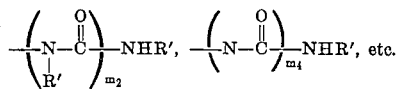

from the above disclosed equations,

R' is as defined above, and $m_1, m_2, m_3, m_4, \ldots$ etc are integers such that $m > m_1$ or $m_2$ or $m_3$ or $m_4 \ldots$ etc, and $m_1 + m_2 + m_3 + m_4 \ldots$ etc., approximates $m$, and $m$ is a whole number of about 5 to 100, inclusive, Me is the cation of the anionic catalyst, and Q is that portion of the structure of the lactam being polymerized which lies between the nitrogen atom and the carbonyl carbon atom of such lactam.

Since the initiators are multifunctional, i.e., they contain more than one initiating site,

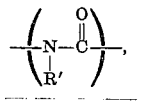

and the residues A and B still contain active sites, the initiation reactions continue until either the active sites are exhausted or the monomer has been depleted. The various initiating reactions can take place simultaneously or consecutively.

The AL. polymeric system is normally solid, i.e., solid at temperatures of about 25° C., and has a reduced viscosity in m-cresol (0.1 gram/100 ml) at 25° C. of $\geq 0.4$, and preferably about 0.8 to 7, deciliters/gram. The polymeric systems have molecular weights of about 1,000 to 500,000 or more.

The polymeric systems prepared with the initiators of the present invention have good color and physical properties. The cast polymers have particularly good high heat distortion temperatures, of the order of $\geq 100°$ C. (264 psi).

THE CATALYST

The catalysts which may be employed in the anionic polymerization reaction of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, i.e., a base strong enough to convert the lactam to its salt. Such bases would include alkali and alkaline earth metals or basic derivatives of such metals such as the hydroxides, oxides, alkoxides, phenoxides, hydrides, alkyls, aryls, amides, borohydrides and weak acid salts, i.e., acetates, carbonates, bicarbonates, benzoates, sulfites and bisulfites; Grignard reagents, and various other organometallic compounds. Such bases would include, therefore, metals such as lithium, sodium, potassium, magnesium, calcium, strontium, barium, and aluminum and derivatives of such metals, such as lithium hydroxide, sodium hydroxide, potassium hydroxide, magnesium hydroxide, calcium hydroxide, strontium hydroxide, barium hydroxide, lithium hydride, sodium hydride, sodium oxide, sodium methoxide, sodium phenoxide, sodium methyl, sodium ethyl, sodium phenyl, sodium naphthyl, and sodamide; Grignard reagents such as ethyl magnesium chloride, methyl magnesium bromide, and phenyl magnesium bromide; and other compounds such as zinc diethyl, triisopropyl aluminum, diisobutyl aluminum hydride, and lithium aluminum hydride.

About 0.2 to 20, and preferably 0.5 to 6 mole per cent of catalyst is used per mole of monomer being polymerized.

The catalyst and initiator are employed in a mole ratio to each other of about 2 to 20, and preferably, 3 to 12.

When the strong base is reacted with the lactam to form the catalyst a by-product is usually formed. For example, hydrogen is formed as a by-product when the metal hydrides or the elemental metals are used; water is formed as a by-product when metal hydroxides are used; alcohols are formed when alkoxides are used and water and $CO_2$ are formed when carbonate or bicarbonate salts are used. The preferred catalysts are those which result in the most readily removable by-products, since some of the by-products, such as $H_2O$, may have a deleterious effect on the polymerization reaction.

THE POLYMERIZATION PROCESS

The polymerization reaction is preferably conducted in bulk. Under such bulk polymerization procedures the monomer, catalyst and initiator are charged in the desired proportions to the reactor. The bulk polymerization reaction is usually conducted at atmospheric pressure and at a temperature of about 100° to 250° C. The reaction can be conducted at a temperature which is above or below the melting point of the resulting polymer, and above that of the monomer. The use of elevated pressure is not required for the polymerization reaction. The bulk polymerization reaction requires a polymerization period of about 3 to 15 minutes at 100°–250° C. depending on the lactam(s) employed, and the polymerization temperature. The bulk polymerization reaction should be carried out under anhydrous conditions, i.e., in the presence of no more than about 0.3 weight per cent, and preferably no more than 0.03 weight per cent, of water or other active hydrogen containing by-product. Where a catalyst is used which would generate water or other active hydrogen containing by-products, such as the hydroxide, alkoxide or phenoxide catalysts, the excess amounts of such by-product materials should be removed before the polymerization reaction is conducted.

The polymerization is preferably carried out under an inert blanket of gas, such as, nitrogen, argon or helium in order to prevent oxidative degradation of the monomer and destruction of the catalyst by moisture.

The reaction may be carried out batchwise or continuously. An advantageous method of carrying out the reaction of the present invention is to conduct the bulk polymerization in conventional molding equipment such as a rotational casting device or a compression molding machine, or an extruder. In this way the polymer and the molded objects can both be formed in one step. Where the polymerization is conducted in such molding devices, conventional molding pressures may be employed in order to simultaneously form the molded object with the in situ formed polymer.

Since the lactams are normally solid materials at room temperatures, the bulk polymerization reactions may be carried out by various procedures. In one procedure, the lactam may be melted, and both the catalyst and the initiator admixed with it and then the reaction may be caused to proceed by bringing the reaction mixture to polymerization temperatures.

In another procedure, the catalyst and initiator may be dissolved separately in the lactam monomer, after which the two separate solutions may be combined to cause the polymerization to proceed at polymerization temperatures. Where the polymerization is conducted in molding equipment, the equipment may be heated to the desired polymerization temperature in order to effect polymerization upon injection therein of the polymerization reaction system.

In addition to being conducted in bulk, the polymerization may also be conducted in high boiling inert organic solvents, i.e., those having boiling points of above 100° C., such as chlorobenzene, dichlorobenzene, xylene, trichlorobenzene, dimethyl sulfoxide, N-alkyl pyrrolidones and hexamethylphosphoramide at temperatures of about 100° C. up to the boiling point of the solvent; or at temperatures of about 130° to 240° C. in dispersion systems such as those disclosed in U.S. Pat. No. 3,061,592 and No. 3,383,352, and by G. B. Gechele and G. F. Martins in J. Applied Polymer Science 9, 2939 (1965).

ADJUVANTS

The polymerization reaction of the present invention may also be conducted in the presence of various types of adjuvant materials which are normally employed with the types of polymers prepared by the present invention, or the adjuvants may be added to the polymer after it is formed. Such adjuvant materials would include fillers, stabilizers, fibrous reinforcing agents such as asbestos and glass fiber, and pigmenting materials.

The particular polymer being prepared as well as the end use application will dictate the selection and quantity of the adjuvant to be employed therewith since it is the respective adjuvants for such polymers and such applications that are to be employed in the present invention. The adjuvants employed must be physically and chemically compatible with each of the other components of the monomer and polymer based compositions, under the prescribed operating conditions. As such, where they are present during the polymerization reaction, the adjuvants should not contain reactive groups which would interfere with the polymerization reactions, such as active hydrogen containing groups such as carboxyl, amino, mercaptan or hydroxyl groups.

The adjuvants would be used in amounts which would be effective for the intended purpose. Thus, a stabilizer would be used in a stabilizingly effective quantity, and the fillers would be used in effective quantities therefor. For example, if a reinforcing filler were to be used, such filler should be used in such amounts as to provide the desired reinforcing effect.

The polymers made by the process of the present invention may be used for a number of applications which require the use of molded articles prepared from lactam polymers such as fibers, films, engineering structures, coatings and hollow articles such as tubing and solvent tanks.

The following examples are merely illustrative of the present invention and are not intended as a limitation upon the scope thereof.

EXAMPLES 1–6 nylon-1 series of six polymerization reactions were carried out in 25 × 200 mm test tubes. In each experiment N-phenyl nylon-1 was used as the initiator, and sodium hydride was used as the catalyst, to polymerize a charge of 56.6 grams of $\epsilon$-caprolactam. The sodium hydride was used in the form of a 57 percent by weight dispersion in mineral oil. In each experiment the catalyst and initiator were first each heated separately in one-half of the monomer charge, and then the molten solutions were then mixed together, and the heating was continued. Polymerization took place rapidly, as evidenced by crystallization (observable as opacity of the system) of the resulting polymers. Heating was continued for an additional two minutes and then the systems were allowed to cool to room temperature. Some of the resulting cast polymers were evaluated for heat distortion temperatures (ASTM D–648–56T), and Izod values (ASTM D–256). Table I below lists the amounts of catalysts and initiators, and the polymerization (heating) temperatures that were employed in each of the experiments, as well as the crystallization times obtained, and the properties of the resulting polymers.

TABLE I

| Ex. | Mol % Catalyst | Mol % initiator | Heating Temp. –°C | Crystall. time- min. | H.D.T.* °C. | Izod value |
|---|---|---|---|---|---|---|
| 1 | 0.5 | 2 | 160 | 7 | 60 | 1.38 |
| 2 | 0.5 | 4 | 160 | 5 | | |
| 3 | 0.5 | 6 | 160 | 6 | | |
| 4 | 1.0 | 2 | 160 | 1.5 | | |
| 5 | 1.0 | 4 | 160 | 1 | | |
| 6 | 1.0 | 2 | 140 | 4 | 160 | 0.7 |

*H.D.T. = heat distortion temperature.

EXAMPLES 7-9

For comparison purposes, several polymerization reactions were conducted using the initiators listed in Table II below, using the same source of ε-caprolactam. All experiments were conducted with 56.6 grams of monomer, 2 mole percent of sodium hydride, and at 160° as in Examples 1-6. The polymerization data and polymers properties shown in Table II clearly shows that toluene diisocyanate is extremely rapid as an initiator whereas s-diphenylurea is significantly slower, and that the polymer made with s-diphenylurea has higher than desirable monomer and oligomer content (per cent extractables) in the resulting polymer.

TABLE II

| Ex. | Initiator | Concentration mole % | Crystal. time, min. | Polymer Properties HDT, °C | Izod | % Extractables |
|---|---|---|---|---|---|---|
| 7 | N-phenyl nylon-1 | 0.5 | 3 | 65 | 0.99 | 7.53 |
| 8 | TDI* | 0.68 | 0.5 | 62 | 0.96 | 7.49 |
| 9 | s-diphenyl urea | 0.5 | 5 | 53 | 1.14 | 21.8 |

*TDI = toluene diisocyanate.

Per cent extractables were obtained by boiling the polymer in methanol for 24 hours.

The exotherms involved in experiments 7 and 8 are shown graphically in the drawing. In the graph of the drawing, the temperature (in °C.) created by the exotherm is plotted against the time (in seconds) needed for the system to reach such temperature. The graph shows that a peak exotherm temperature of about 191° C. was achieved with the toluene diisocyanate (TDI) initiator of Example 7 in about one half the time needed (about 60 seconds) for the peak exotherm temperature of about 192.5° C. to be reached (in about 118 seconds) with the poly-N-phenyl isocyanate initiator of Example 8. The substantially slower exotherm of Example 8 allows for substantially better control of the reaction conditions than can be obtained with the exotherms obtained as in Example 7.

EXAMPLE 10

ε-caprolactam was polymerized as disclosed in Examples 1-6 using 2 mole percent of sodium hydride as the catalyst and 0.5 mole percent of poly(N-butyl isocyanate) as the initiator. The time required for the solution of the reactants to reach a stage of no-flow viscosity was about one hour, and the time for the system to reach a stage of crystallization was about 1.5 hours at a reaction temperature of 160° C.

The poly(N-butyl isocyanate) used in Example 10 had a reduced viscosity value of 0.08 (as a 0.1 gram (100 ml solution) in m-cresol. The poly(N-phenyl isocyanate) or N-phenyl nylon-1 initiator used in Examples 1-7 was insoluble in m-cresol.

The exotherms obtained in the reactions of Examples 1-6 and 10 were as mild as that of the exotherm of Example 7 and thus allowed for a substantially more facile control of such reactions.

What is claimed is:

1. An improved process for anionically polymerizing lactam monomer with anionic lactam polymerization catalyst and anionic lactam polymerization initiator which comprises using as said initiator, about 0.1 to 10 mol percent, based on the moles of lactam monomer being polymerized, of at least one compound having the structure

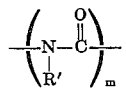

wherein $m$ is a whole number of about 5 to 100, inclusive, and $R'$ is a $C_1$ to $C_{20}$, inclusive, hydrocarbon radical which is substituted or unsubstituted, and which is a primary alkyl, primary aralkyl or primary alkenyl group, or an aryl or alkaryl group, with the proviso that in each of said latter two groups each annular carbon atom therein which is adjacent to the carbon atom attached to the nitrogen atom bears one hydrogen atom, and with the further proviso that $R'$ is free of substituents which are either reactive with the isocyanate $R'NCO$ in solution at temperatures below about $-20°$ C., or which are more reactive with said lactam monomer than the carbonyl group in said initiator.

2. A process as in claim 1 in which said lactam monomer comprises ε-caprolactam.

3. A process as in claim 2 in which said initiator comprises poly(N-phenyl isocyanate).

4. A process as in claim 2 in which said initiator comprises poly(N-butyl isocyanate).

5. A process as in claim 1 which is conducted in a shaping device with the simultaneous formation of a shaped object.

6. A polymeric system comprising one or more polymers, each of said polymers having the structure

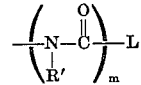

wherein L is a polymerized chain of lactam monomer, $m$ is a whole number of about 5 to 100, and $R'$ is a $C_1$ to $C_{20}$, inclusive, hydrocarbon radical which is substituted or unsubstituted, and which is a primary alkyl, primary aralkyl or primary alkenyl group, or an aryl or alkaryl group, with the proviso that in each of said latter two groups each annular carbon atom therein which is adjacent to the carbon atom attached to the nitrogen atom bears one hydrogen atom, and with the further proviso that $R'$ is free of substituents which are either reactive with the isocyanate $R'NCO$ in solution at temperatures below about $-20°$ C., or which are more reactive with said lactam monomer than the carbonyl group in said initiator.

7. A polymeric system as in claim 6 in which said lactam polymer comprises ϵ-caprolactam.

8. A polymeric system as in claim 7 in which R' is phenyl.

9. A polymeric system as in claim 7 in which R' is butyl.

10. A polymeric system as in claim 6 in the form of a shaped object.

* * * * *

UNITED STATES PATENT OFFICE
CERTIFICATE OF CORRECTION

Patent No. 3,681,473     Dated August 1, 1972

Inventor(s) S. W. Chow, et al.

It is certified that error appears in the above-identified patent and that said Letters Patent are hereby corrected as shown below:

Column 1, line 24, "3,440,227." should read --these--.

Column 2, lines 26-30, the structure should read

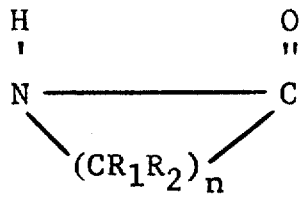

Column 2, lines 47-53, that portion of the structure reading

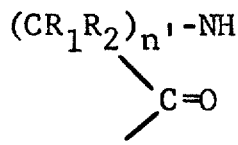     should read     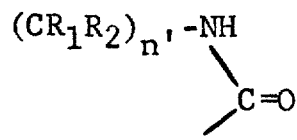

Column 4, line 64, "Al" should read --AL--.

Column 5, lines 30-32, that portion of the structures reading

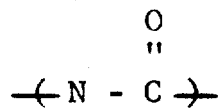     should read     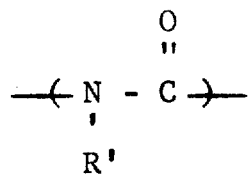

Column 8, line 35, "nylon-1" should read --A--.

Column 9, lines 44 and 52, "7" should read --8--; and lines 48 and 49, "8" should read --7--.

Signed and sealed this 9th day of January 1973.

(SEAL)
Attest:

EDWARD M. FLETCHER, JR.
Attesting Officer

ROBERT GOTTSCHALK
Commissioner of Patents